United States Patent [19]

Keppeler et al.

[11] Patent Number: 5,266,407
[45] Date of Patent: Nov. 30, 1993

[54] MAGNETIC RECORDING MEDIA

[75] Inventors: Uwe Keppeler, Ludwigshafen; Michael Bobrich, Boehl-Iggelheim; Helmut Auweter, Limburgerhof; Rudolf Suettinger, Heidelberg; Albert Kohl, Laumersheim; Hermann Dikow, Hockenheim; Werner Lenz, Bad Duerkheim; Gregor Brodt, Heppenheim, all of Fed. Rep. of Germany

[73] Assignee: BASF Magnetics GmbH, Mannheim, Fed. Rep. of Germany

[21] Appl. No.: 804,655

[22] Filed: Dec. 11, 1991

[30] Foreign Application Priority Data

Dec. 13, 1990 [DE] Fed. Rep. of Germany ....... 4039748

[51] Int. Cl.$^5$ .......................... B32B 27/40; G11B 5/70
[52] U.S. Cl. ............................. 428/425.9; 252/62.54; 428/694; 428/900
[58] Field of Search ............... 428/694, 900, 425.9; 252/62.54

[56] References Cited

U.S. PATENT DOCUMENTS

| | | | |
|---|---|---|---|
| 2,871,218 | 1/1959 | Schollenberger | 525/440 |
| 2,899,411 | 8/1959 | Schollenberger | 528/76 |
| 4,152,485 | 5/1979 | Mizumura et al. | 428/425.9 |
| 4,420,531 | 12/1983 | Tokuda | 428/329 |
| 4,423,115 | 12/1983 | Tokuda | 428/425.9 |
| 4,477,531 | 10/1984 | Kohler et al. | 428/425.9 |
| 5,082,737 | 1/1992 | Bobrich et al. | 428/694 |

FOREIGN PATENT DOCUMENTS

| | | |
|---|---|---|
| 193084 | 4/1988 | European Pat. Off. |
| 143337 | 7/1989 | European Pat. Off. |
| 2054622 | 2/1981 | United Kingdom |

Primary Examiner—Paul J. Thibodeau
Assistant Examiner—D. S. Nakarani
Attorney, Agent, or Firm—Keil & Weinkauf

[57] ABSTRACT

In magnetic recording media consisting of a nonmagnetic substrate and one or more magnetizable layers bonded thereon and based on a polyurethane binder, the binder consists of not less than 50% by weight of an isocyanate-free, branched polyurethane which is soluble in tetrahydrofuran and has sulfonate groups along the polyurethane branches and OH-containing urea groups at the chain ends and a molecular weight of from 4,000 to 30,000.

14 Claims, No Drawings

MAGNETIC RECORDING MEDIA

The present invention relates to magnetic recording media consisting of a nonmagnetic substrate and one or more magnetizable layers bonded thereon and based on a polyurethane binder, the binder consisting of not less than 50% by weight of a branched polyurethane elastomer having metal sulfonate groups and possessing urea groups at the chain ends.

BACKGROUND OF THE INVENTION

Magnetic recording media are having to meet increasingly stringent requirements with regard to recording, playback and aging resistance. The binder is becoming increasingly important for meeting these requirements.

For example, to improve the magnetic properties, a higher packing density of the magnetic material is desirable in the layer, resulting in a reduction in the binder content of the layer. Attempts are also being made to achieve an improved signal/noise ratio by the use of increasingly finely divided magnetic materials having a pronounced acicular shape. These materials are furthermore very often surface-modified to reduce aging phenomena. As a result of such measures, both the division of the pigments in the dispersing process and the achievement of good dispersion stability are made considerably more difficult. In general, however, the magnetic layers must be very flexible and have high elasticity and good tensile strength. Furthermore, to avoid drops in output level, a reduction in the coefficient of friction, an increase in abrasion-resistance and better wear properties are increasingly being required. In addition, the mechanical stability of the magnetic layer must also be ensured, particularly at high temperature and high atmospheric humidity.

It is known that magnetic layers which are subjected to strong mechanical stresses contain polyurethane elastomers which prove to be advantageous as binders. Polyesterurethanes as described in DE-B 1 106 959, DE-B 2 753 694, EP-A 0 069 955 or U.S. Pat. No. 2,899,411 have particularly proven useful.

However, these binders are not suitable in conjunction with the requirements and measures described above. In many cases, pigment wetting and pigment dispersion are adversely affected, so that any material sintered during the milling process is not sufficiently broken down or agglomeration of the pigment particles is not sufficiently prevented, leading to poor magnetic properties and hence to poor tape properties in respect of electroacoustics and video data. Relatively small amounts of low molecular weight dispersants are therefore added to facilitate the dispersing process. Although these dispersants have good deagglomeration properties, they stabilize the dispersion poorly. Higher molecular weight dispersing resins are therefore often used as additional components. DE-A 30 26 357 and DE 31 37 293 describe, for example, the addition of polyester resins which have $SO_3M$ groups.

However, these methods for improving the dispersing process have disadvantages. For example, low molecular weight dispersants may readily be exuded in unfavorable climatic conditions, such as high temperature and/or high atmospheric humidity. This results in deposits on all parts in contact with the tape, particularly on the head, in recording and playback apparatuses, causing drops in output level. Furthermore, the friction (adhesion) increases greatly and may result in stopping of the tape, i.e. blocking. On the other hand, when dispersing resins are used, there may be compatibility problems in the dispersion. These substances are frequently not film formers and thus also cause blocking. Moreover, the mechanical properties of these dispersing resins are often not matched with the properties of the polyurethane used as the main binder. A deterioration in the mechanical properties also always means an increase in abrasion.

Since the amount required depends on the number of square meters ($m^2$) of pigment surface area, the use of low molecular weight dispersants leads to a total amount of dispersant which is unacceptable for the properties of the tape. Since these dispersants contain polar groups, the hydrophilicity of the layer increases greatly and hence, especially in a humid climate, also effects such as the following:

Swelling of the layer
Exudation of the dispersants and lubricants
Changes in the mechanical properties due to changes in the plasticizer effects.

Consequently, there is a greater tendency of the tape to block and soiling of the head is more likely.

To improve the dispersing properties of the polyurethane binder itself, it was proposed at an early stage to incorporate polar groups into the binder. These polar groups can in principle be introduced via any component which is used in the preparation of the polyurethane. Polyesters having polar groups are most frequently used (cf. inter alia DE-A 28 33 845). Incorporation of diols which additionally carry polar groups is described in, for example, JP-A 57 092 421, German Laid-Open Application DOS 3,814,536 and EP-A 193 084. The subsequent incorporation of the polar groups by nucleophilic substitution ($S_N$) reaction at the terminal OH groups of the polyurethanes is disclosed in JP-A 57 092 422. The polyurethanes described to date and carrying polar groups have improved dispersing behavior but the improvement is still insufficient for many requirements.

A further disadvantage of all polyurethanes described is that the required elasticity is frequently accompanied by insufficient hardness and a tendency to exhibit surface tack. Combining corresponding polyurethanes with other binders is therefore part of the prior art. Proposed binder combinations are, for example, mixtures of polyurethanes with phenoxy resins, with vinylidene chloride/acrylonitrile copolymers, with vinyl chloride/acrylate copolymers or with polycarbonates or polyesters. DE-A 32 39 160 may be mentioned by way of example. Although these binder combinations lead to an improvement in the mechanical properties of the magnetic layer, the dispersing behavior of such a combination is adversely affected. The particular properties of the magnetic materials thus have an unsatisfactory effect. This is evident from a lower orientation ratio, lower residual induction and hence lower sensitivity at short and long wavelengths and a more unsatisfactory output level of the resulting recording media.

A possible method for increasing the hardness of the polyurethanes is to increase the concentration of urethane and urea groups. However, such measures very rapidly lead to products which are insoluble in conventional solvents, such as methyl ethyl ketone, toluene or tetrahydrofuran (EP-A 01 43 337). According to DE-A 31 37 293, nonmagnetic particles are admixed for increasing the hardness.

However, the measures described are not sufficient for simultaneously meeting the increased requirements for the binder system. Moreover, a combination of the polyurethanes with other binders is often essential for achieving individual effects.

However, the disadvantages of using high molecular weight binders are the high solvent requirement, the relatively long dispersing times and/or the necessary 2-phase dispersing. Furthermore, the particular properties of the magnetic materials are not satisfactorily displayed in these binder systems. This is shown by the low orientation ratio, low residual induction and hence low sensitivity at short and long wavelengths and an unsatisfactory output level of the resulting recording media.

An important improvement in the dispersing behavior is achieved by means of low molecular weight OH-containing polyurethanes as described in EP 0 099 533.

However, these measures too are insufficient for dispersing increasing finely divided pigments and for meeting the growing requirements for the magnetic recording media with regard to mechanical and magnetic properties.

It is an object of the present invention to provide a binder system for extremely finely divided ferromagnetic pigments having a BET surface area $>40$ $m^2g^{-1}$ for novel high density recording systems, such as S-VHS in the video sector, DAT in the audio sector or novel computer tapes (MTC) in the data sector, which binder system meets the abovementioned requirements of

- a good dispersing effect
- rapid dispersion
- good stabilization of the dispersion
- low solvent requirement
- good rheology of the dispersion, i.e. low flow limit and not too high a viscosity
- good leveling on casting
- high pigment content of the layer
- good orientability of the magnetic needles
- good mechanical properties of the magnetic layer even at high temperatures.

SUMMARY OF THE INVENTION

We have found that this object is achieved by a magnetic recording medium, consisting of a nonmagnetic substrate and one or more magnetic layers bonded thereon and based on a magnetic material finely distributed in a binder consisting of not less than 50% by weight of a thermoplastic polyurethane, if the thermoplastic polyurethane used is a sulfonate-containing, isocyanate-free, branched polyurethane which is soluble in tetrahydrofuran and has OH-containing urea groups at the chain ends and a molecular weight of from 4,000 to 30,000 and which is prepared from A) 1 mol of a polyol having a molecular weight of from 400 to 4,000,
B) from 0.3 to 9 mol of a mixture of
   B1) one or more diols of 2 to 18 carbon atoms and
   B2) a diol having one or more sulfonate groups,
C) from 0.01 to 1 mol of a triol of 3 to 25 carbon atoms,
D) from 1.25 to 13 mol of a diisocyanate of 6 to 30 carbon atoms, the NCO:OH ratio in the sum of the components A, B, C and D being from 1.05:1.0 to 1.4:1.0, and
E) from 0.05 to 4 mol of an OH-containing primary or secondary amine which is reactive toward isocyanates.

To achieve special properties, it is advantageous if the polymer has an OH number of from 25 to 100, preferably from 30 to 70. The molecular weight is from 4,000 to 30,000, corresponding to a K value (1% strength in dimethylformamide) of from 25 to 40. In the structure of these polymers, it has proven advantageous if some, preferably more than 80%, in particular more than 90%, of the terminal OH groups consist of one of the following radicals:

—NH—CO—NR'—R—OH or

—NH—CO—NR'—R—OH or

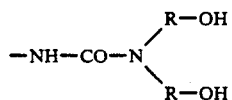

where R is —$(CH_2)_n$—, R' is —H, —$CH_3$ or —$(CH_2)_n$—$CH_3$ and n is from 1 to 10.

Polymers having this composition have improved adhesion compared with those without these terminal groups. This also makes it possible to increase the content of terminal OH groups, with the result that, in the crosslinking with polyisocyanate, the degree of crosslinking can be varied within wide limits to meet the requirements for the magnetic layer. The urea groups, which improve the mechanical properties of the layer and the adhesion are also advantageous.

The ratio of component B1 to component B2 is advantageously chosen according to the specific surface area of the magnetic material used.

DETAILED DESCRIPTION OF THE INVENTION

The polyurethanes used according to the invention as binders in the magnetic layers generally have a hardness of from 20 to 130 s according to DIN 53,157. They furthermore have a modulus of elasticity (according to DIN 53,457) of from 50 to 2,500 $Nmm^{-2}$, an elongation at break greater than 70% (DIN 53,455) and a tensile strength of from 25 to 70 $Nmm^{-1}$ (DIN 53,455). The softening point is from 80° to 180° C. A pendulum hardness (DIN 53,157) of from 25 to 125 s, a modulus of elasticity of from 55 to 2,000 $Nmm^{-2}$, an elongation at break of from 80 to 500% and a tensile strength of from 25 to 50 $Nmm^{-2}$ are particularly advantageous.

The advantageous properties of the magnetic recording media having the composition according to the invention are also clearly evident in comparison with those obtained using the conventional thermoplastic polyurethane elastomers if a polyisocyanate is added to the substrate before application of the dispersion. A large number of organic di-, tri- or polyisocyanates or isocyanate prepolymers having a molecular weight of up to 10,000, preferably from 500 to 3,000, can be used for crosslinking. Polyisocyanates or isocyanate prepolymers which carry more than 2 NCO groups per molecule are preferred. Polyisocyanates based on toluylene diisocyanate, hexamethylene diisocyanate or isophorone diisocyanate, which are formed by a polyaddition reaction with di- or triols or by biuret and isocyanurate formation, have proven particularly suitable. An adduct of toluylene diisocyanate with trimethylolpropane and diethylene glycol is particularly advantageous.

Depending on the requirements set for the recording material, the amount of added polyisocyanate component, based on the OH group of the polyurethane binder to be crosslinked, may be up to 70%, preferably up to 50%, less than the stoichiometric amount or an excess of up to 100%, preferably up to 50%.

For the preparation of the polyurethanes, a polydiol having a molecular weight of from 400 to 4,000, preferably from 700 to 2,500, is used as component A. The known polyesterols, polyetherols, polycarbonatediols and polycaprolactonediols are suitable for this purpose.

Polyesterols are advantageously predominantly linear polymers having terminal OH groups, preferably those having two terminal OH groups. The acid number of the polyesterols is less than 10, preferably less than 3. The polyesterols can be prepared in a simple manner by esterification of aliphatic, aromatic dicarboxylic acids of 4 to 15, preferably 4 to 6, carbon atoms with glycols, preferably glycols of 2 to 25 carbon atoms, or by polymerization of lactones of 3 to 20 carbon atoms. Examples of suitable dicarboxylic acids are glutaric acid, pimelic acid, suberic acid, sebacic acid, dodecanedioic acid and preferably adipic acid, succinic acid and phthalic acids. The dicarboxylic acids can be used individually or as mixtures. For the preparation of the polyesterols, it may be advantageous to use the corresponding acid derivatives, such as anhydrides or carbonyl chlorides, instead of the dicarboxylic acids. Suitable aromatic dicarboxylic acids are terephthalic acid, isophthalic acid or mixtures of these with other dicarboxylic acids, for example diphenic acid, sebacic acid, succinic acid and adipic acid. Examples of suitable glycols are diethylene glycol, pentane-1,5-diol, decane-1,10-diol and 2,2,4-trimethylpentane-1,5-diol. Ethane-1,2-diol, butane-1,4-diol, hexane-1,6-diol and 2,2-dimethylpropane-1,3-diol, 1,4-dimethylolcyclohexane, 1,4-diethanolcyclohexane and ethoxylated/propoxylated products of 2,2-bis-(4-hydroxyphenylene)-propane (bisphenol A) are preferably used. Depending on the desired properties of the polyurethanes, the polyols can be used alone or as a mixture in various proportions. For example, $\alpha,\alpha$-dimethyl-$\beta$-propiolactone, $\gamma$-butyrolactone and preferably $\epsilon$-caprolactone are suitable lactones for the preparation of the polyesterols.

The polyetherols are essentially linear substances which have terminal hydroxyl groups, contain ether bonds and possess a molecular weight of about 600–4,000, preferably 1,000–2,000. Suitable polyetherols can readily be prepared by polymerizing cyclic ethers, such as tetrahydrofuran, or by reacting one or more alkylene oxides, where the alkylene radical is of 2 to 4 carbon atoms, with an initiator molecule which contains two bonded active hydrogen atoms in the alkylene radical. Examples of suitable alkylene oxides are ethylene oxide, 1,2-propylene oxide, epichlorohydrin and 1,2- and 2,3-butylene oxide. The alkylene oxides can be used individually, alternately in succession or as a mixture. Examples of suitable initiator molecules are water, glycols, such as ethylene glycol, propylene glycol, butane-1,4-diol and hexane-1,6-diol, amines, such as ethylenediamine, hexamethylenediamine and 4,4'-diaminodiphenylmethane, and aminoalcohols, such as ethanolamine. As in the case of the polyesterols, the polyetherols too can be used alone or as mixtures.

The polycarbonatediols and their preparation are described in U.S. Pat. No. 4,131,731 and are generally based on hexane-1,6-diol.

Diols of 2 to 20, preferably 2 to 10, carbon atoms are used as building block B1, for example ethane-1,2-diol, propane-1,3-diol, butane-1,4-diol, hexane-1,6-diol, pentane-1,5-diol, decane-1,10-diol, 2-methylpropane-1,3-diol, 2-methyl-2-butylpropane-1,3-diol, 2,2-dimethylbutane-1,4-diol, 2-methyl-2-butylpropane-1,3-diol, neopentylglycol hydroxypivalate, diethylene glycol, triethylene glycol and methyldiethanolamine. The diols can be used individually or as mixtures. It is also possible to use minor amounts of diamines of 2 to 15 carbon atoms, such as ethylenediamine, 1,6-hexamethylenediamine, 4,9-dioxododecane-1,12-diamine or 4,4,-diaminodiphenylmethane, or aminoalcohols, e.g. monoethanolamine, monoisopropanolamine and 2-amino-2-methylpentan-2-ol. It has proven advantageous to incorporate the resulting urea groups into the polymer chain. The urea groups at the chain end are of minor importance.

The stated diols can also be completely or partly replaced by water.

The diols forming component B2) contain one or more —SO$_2$M—groups. Examples of these are compounds of the formula (I) as described in DE 34 07 562

$$R^1CH_2O-(C_2H_4O)_n(C_3H_7O-)_mCH_2CHR^3CH_2-SO_3X$$

where R

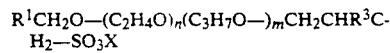

$R^2$ is CH$_3$—, C$_2$H$_5$— or C$_3$H$_7$—,
$R^3$ is H— or CH$_3$—,
X is H or an alkali metal or ammonium ion,
n is from 0 to 100,
m is from 0 to 50 and
n+m ≧ 1,
and diols of the formula (II), some of which are described in O.Z. 0050/41048:

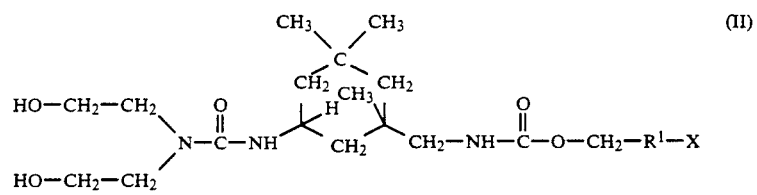

where
R$^1$ is a straight-chain or branched or cyclic radical of 1 to 40 carbon atoms, the carbon atoms accounting for from 20 to 86% by weight, or

where $R^3$ is H or $CH_3$,
n is from 0 to 100,
m is from 0 to 50,
$n+m \geq 1$ and
X is $-SO_2M$, where M is H, Li, Na, K or ammonium and $M^1$ and
$M^2$ may be identical or different and are each H, Li, Na, K or alkyl.

The triols for component C) are compounds of 3 to 18, preferably 3 to 6, carbon atoms. Examples of corresponding triols are glycerol or trimethylolpropane. Low molecular weight reaction products of, for example, trimethylolpropane with ethylene oxide and/or propylene oxide are also suitable. The presence of triols in the polyaddition leads to branching of the end product, which, unless local crosslinking occurs, has an advantageous effect on the mechanical properties of the polyurethane. Suitable polyols are, for example, erythritol, pentaerythritol and sorbitol.

For the formation of the NCO-containing intermediates, the components stated under A, B and C are reacted with aliphatic, cycloaliphatic or aromatic diisocyanates of 6 to 30 carbon atoms (component D). Compounds such as toluylene 2,4-diisocyanate, toluylene 2,6-diisocyanate, m- and p-tetramethylxylylene diisocyanate, m-phenylene diisocyanate, 4-chlorophenylene 1,3-diisocyanate, naphthylene 1,5-diisocyanate, hexamethylene 1,5-diisocyanate, hexamethylene 1,6-diisocyanate, cyclohexylene 1,4-diisocyanate and tetrahydronaphthylene 1,5-diisocyanate, 4,4'-diphenylmethane diisocyanate, dicyclohexylmethane diisocyanate, isophorone diisocyanate and mixtures thereof are suitable for this purpose.

The NCO-containing intermediates of components A to B are then reacted with the aminoalcohols (component E) to give the OH-containing polyurethaneurea elastomers. These aminoalcohols of 2 to 16, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Aminodiols are particularly suitable since they undergo an addition reaction at the chain end and hence result in a doubling of the OH number of the polymers. Diethanolamine and diisopropanolamine have proven particularly advantageous.

The ratio of components A to E to one another may be varied from 1.25 to 13 mol of diisocyanate per mol of polydiol with the use of from 0.3 to 9, preferably from 0.5 to 5, mol of the diol of 2 to 18 carbon atoms and from 0.01 to 1, preferably from 0.15 to 0.5, mol of triol, the amount of diol used depending in part on the molecular weight of the polydiol used. The amount of isocyanate used should be from 5 to 35% less than the stoichiometric amount, based on the amounts of NH— or hydroxyl-containing compounds, so that, at the end of the reaction, virtually no free, unconverted isocyanate remains but free, unconverted hydroxyl groups are still present. For practical and coating reasons, it is frequently advantageous to use, in a preliminary reaction of components A, B, C and D an excess of diisocyanate of from 5 to 40%, preferably from 10 to 30%, based on the amount required for complete reaction of the reactants, so that the ratio of the number of hydroxyl groups used to the number of isocyanate groups in this reaction stage is from about 1:1.05 to 1:1.4, preferably from about 1:1.1 to 1:1.30. In the second reaction stage, an amount of component E containing a number of NH equivalents corresponding to the NCO content, i.e. from 0.05 to 4, preferably from 0.3 to 2.5, mol per mol of component A, is then added, or the NCO prepolymer is added to the aminoalcohol, so that the amino groups react with the isocyanate. If, in the second reaction stage, slightly less than the stoichiometric amount, based on the NCO groups, of NH or $NH_2$ groups is offered, some of the amino-alcohol is incorporated in the molecule and, depending on the aminoalcohol, provides a branching point. If an excess of NH groups is used, the aminoalcohol is not fully incorporated in the polymer until the crosslinking reaction. Thus, by choosing the terminal groups, i.e. by varying said groups, it is possible to match the polymer to the particular requirements, such as the ability to form films or to disperse.

The thermoplastic, elastic OH-containing polyurethanes synthesized in this manner are prepared in solution by the 2-stage process, in the presence or absence of catalysts and other assistants and/or additives. It is not possible to prepare these products by the solvent-free batch process. Since gel particles are formed in some or all cases during the polyaddition in the absence of a solvent, owing to the presence of the triol and the reaction of the amine with the NCO groups, the reaction is carried out in solution. In general, the danger of local overcrosslinking, as occurs in polyaddition in the absence of a solvent, is avoided in polyaddition in solution.

Depending on the reaction conditions, for example the amount of solvent, the heat of reaction and reactivity of the components, two different procedures are possible in the 2-stage process and differ from one another only in the first stage. Different procedures are described by way of example.

Procedure 1: The diisocyanate is initially taken together with a little solvent, after which building blocks A, B and C and, if required, the catalyst and the assistants and additives in solvent are added at from 20° to 90° C., preferably from 30° to 70° C., in the course of from 0.2 to 5 hours. The components are reacted to the desired NCO content, and the stopping agent (component E) is then added in the second stage.

Procedure 2: In this process, all starting components A to D are dissolved in some of the solvent so that solutions having a solids content of from 15 to 50% by weight are formed. The stirred solutions are then heated to 20°–90° C., preferably 30°–70° C., if necessary after the addition of a catalyst. Thereafter, the components are reacted until the desired NCO content is obtained, after which the stopping agent is added in the second stage.

Procedure 3: The starting components A, B and C are reacted with some of component D (for example with the less reactive isocyanate if component D is a mixture of a plurality of diisocyanates) in some of the solvent at from 20° to 90° C., preferably from 30° to 70° C., if necessary after the addition of a catalyst until an NCO content of 0% is obtained. The remainder of component D is then added and the total reaction solution is reacted until the desired NCO content is obtained. The stopping agent (component E) is then added in the second stage.

In the 2-stage process according to Procedure 1 or 2, the first stage is carried out with a continuous NCO excess relative to building blocks A to C. In both procedures, it is possible to begin the reaction in some of the solvent and to add the remaining solvent during or after the reaction.

Tetrahydrofuran is preferably used as the solvent for the preparation of the polyurethanes. The polyurethanes can of course also be prepared in other polar solvents, such as dioxane, cyclohexanone, dimethylformamide, N-methylpyrrolidone, dimethyl sulfoxide or ethylglycol acetate, depending on the field of use. It is also possible to mix the stated solvents with aromatics, such as toluene or xylene, and esters, such as ethyl or butyl acetate.

The following are examples of suitable catalysts for the preparation of the polyurethanes and for the crosslinking reaction: tertiary amines, such as triethylamine, triethylenediamine, N-methylpyridine and N-methylmorpholine, metal salts, such as tin octoate, lead octoate and zinc stearate, and organometallic compounds, such as dibutyltin dilaurate. The suitable amount of catalyst is dependent on the efficiency of the relevant catalyst. In general, it has proven advantageous to use from 0.005 to 0.3, preferably from 0.01 to 0.1, part by weight per 100 parts by weight of polyurethane.

The polyurethanes used according to the invention can be employed as the sole binder for the preparation of magnetic layers, but it is advantageous, for specific intended uses in the case of magnetic recording media according to the invention, to add a second binder component in amounts of from 5 to 50, preferably from 10 to 40, parts by weight, based on the resulting total amount of binder.

The physically drying binders present in the binder mixture are known. They include a polyvinylformal binder, which was prepared by hydrolysis of a polymer of a vinyl ester followed by reaction of the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups and have a specific gravity of about 1.2 and a viscosity of about 50 to 120 mPa.s, measured at 20° C. in a solution of 5 g of polyvinylformal in 100 ml of 1:1 phenol/toluene. In addition to the polyvinylformal, vinyl chloride/diol mono- or di(meth)acrylate copolymers, which can be prepared, for example, in a conventional manner by solution copolymerization or suspension copolymerization of vinyl chloride and the diol monomethacrylate or monoacrylate, are also suitable. The diol mono- or diacrylate or -methacrylate used for this purpose is an esterification product of an acrylic acid or methacrylic acid with the corresponding molar amount of an aliphatic diol of 2 to 4 carbon atoms, such as ethylene glycol, butane-1,4-diol or preferably propanediol, the propanediol preferably consisting of propane-1,3-diol and from 0 to 50% by weight of propane-1,2-diol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as vinyl chloride/propanediol monoacrylate copolymers, in a mixture of equal parts by volume of tetrahydrofuran and dioxane, has a viscosity of about 30 mPa.s at 25° C. The K value according to H. Fikentscher (Cellulosechemie 13 (1932), 58 et seq.) of the particularly suitable products is from 30 to 50, preferably about 40.

Phenoxy resins whose constitution can be described by the repeating formula

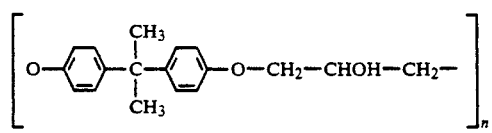

where n is approximately 100, can also be used. These are polymers such as those known under the trade names Epikote ® from Shell Chemical Co. or under the name epoxy resin PKHH ® from Union Carbide Corporation.

Cellulose ester binders are also suitable for use in the stated binder mixture. These are esterification products of cellulose with nitric acid or with carboxylic acids of 1 to 4 carbon atoms, e.g. cellulose acetate, cellulose triacetate, cellulose acetopropionate or cellulose acetobutyrate.

The use of a non-dispersant binder component, e.g. VAGH ®, Pioloform ® or PKHH ®, etc., may lead to a deterioration in the dispersing effect or in the stability of the dispersion, since the amount of dispersant polyurethane is reduced.

The use of, for example, sulfonate-containing vinyl chloride copolymers according to, for example, U.S. Pat. No. 4,748,084, which are available as a commercial product MR 110 ® from Nippon Zeon, has proven advantageous.

If these cobinders carry groups which are active toward isocyanate (for example —OH), they can also be incorporated in a network with the use of crosslinking agents.

The further processing of the binder mixture with magnetic materials and assistants to give the novel magnetic recording media is carried out in a conventional manner.

Suitable anisotropic magnetic materials are the conventional pigments which substantially influence the properties of the resulting magnetic layers, for example gamma-iron(III) oxide, finely divided magnetite, ferromagnetic undoped or doped chromium dioxide, cobalt-modified gamma-iron(III) oxide, barium ferrites or ferromagnetic metal particles. Acicular cobalt-modified or unmodified gamma-iron(III) oxide and ferromagnetic chromium dioxide and metal pigments are preferred. The particle size is in general from 0.1 to 2 µm, preferably from 0.15 to 0.8 µm.

The novel binders can be used in formulations without additional use of low molecular weight dispersants. However, it is also possible to add a dispersant, e.g. lecithin, zinc oleate or zinc stearate, in minor amounts which are small compared to the prior art.

The magnetic layers furthermore contain small amounts of additives, such as lubricants or fillers, which are mixed in during dispersing of the magnetic materials or during production of the magnetic layer. Examples of such additives are fatty acids or isomerized fatty acids, such as stearic acid or salts thereof with metals of the first to fourth main groups of the Periodic Table of elements, and fatty esters or waxes, silicone oils, carbon black, etc. The amount of the additives is the conventional one and is in general less than 10% by weight, based on the magnetic layer.

The ratio of magnetic material to binder in the novel recording materials is from 1 to 10, in particular from 3 to 6, parts by weight of magnetic material to one part by weight of the binder mixture. It is particularly advantageous that, owing to the excellent pigment binding capacity of the special polyurethanes, high magnetic material concentrations in the magnetic layers are possible without the elastic properties deteriorating or the performance characteristics suffering markedly.

The usual rigid or flexible substrates, in particular films of linear polyesters, such as polyethylene terephthalate, generally having a thickness of from 4 to 200 $\mu$m, in particular from 6 to 36 $\mu$m, can be used as nonmagnetic and nonmagnetizable substrates. Recently, the use of magnetic layers on paper substrates for electronic computing and accounting machines has also become important; the novel coating materials can also advantageously be used for this purpose.

The novel magnetic recording media can be produced in a known manner. Advantageously, the magnetic pigment dispersion prepared in a dispersing apparatus, for example a tubular ball mill or a stirred ball mill, from the magnetic material and a solution of the binders with the addition of lubricants and possibly small amounts of dispersants is mixed with the polyisocyanate crosslinking agent and the mixture is then filtered and applied to the nonmagnetic substrate using a conventional coating apparatus, for example a knife coater. To achieve good electroacoustic and magnetic properties during a short dispersing time, it is advantageous to carry out dispersing with component 1 and to stir in components 2 after the dispersing process. This method is appropriate where the stated components 2 is readily compatible with component 1. As a rule, magnetic orientation is carried out before the liquid coating mixture is dried on the substrate; the latter step is advantageously effected in from 10 to 200 s at from 50° to 90° C. The magnetic layers can be calendered and compacted on a conventional apparatus by being passed between heated and polished rollers, if necessary with the use of pressure and temperatures of from 25° to 100° C., preferably from 60° to 90° C. In the case of crosslinking binders, it is preferably very advantageous to carry out calendering before crosslinking is complete since the OH polymers in the uncrosslinked state are very thermoplastic without being tacky. The thickness of the magnetic layer is in general from 0.5 to 20 $\mu$m, preferably from 1 to 10 $\mu$m. In the case of the production of magnetic tapes, the coated films are slit in the longitudinal direction into the conventional widths, generally based on inches.

In the Examples and Comparative Experiments which follow, parts and percentages are by weight, unless stated otherwise. Parts by volume bear the same relation to parts by weight as that of the liter to the kilogram.

Polymer A 225.45 g of a polyester of adipic acid and butane-1,4-diol (molecular weight about 1,000), 23.76 g of hexane-1,6-diol, 1.23 g of trimethylolpropane and 13.97 g of a polyether-1,3-diol sulfonate (molecular weight 1,340) were reacted in 380.57 g of tetrahydrofuran with 43.85 g of toluylene 2,4-diisocyanate at 60° C. after the addition of one drop of dibutyltin dilaurate until an NCO content of 0% was reached. Thereafter, 62 g of 4,4'-diphenylmethane diisocyanate were added and the reaction was continued to the end point (NCO content: 0.549%). The mixture was then cooled to 45° C. and 10.32 g of didthanolamine were added. The resulting polymer solution was then diluted to a solids content of 15.5% with 1545.34 g of tetrahydrofuran. The polymer had an OH number of 28.95 and a K value (measured in a 1% strength solution in dimethylformamide) of 33.9.

Polymer B 43.86 g of toluylene diisocyanate and 61.98 g of diphenylmethane diisocyanate, dissolved in 189.8 g of tetrahydrofuran, were heated to 60° C. and one drop of dibutyltin dilaurate was added. A solution of 205.34 g of an OH-containing polyester of adipic acid and butane-1,4-diol (molecular weight about 1,000), 21.66 g of hexane-1,6-diol, 1.10 g of trimethylolpropane and 12.66 g of a polyether-1,3-diol sulfonate (molecular weight 1,340) in 175.88 g of tetrahydrofuran was added in the course of two hours. After an NCO content of 1.05% had been reached, the mixture was cooled to 45° C. and 18.78 g of diethanolamine were then added. The resulting product had a solids content of 50.0%, an OH number of 54.7 and a K value (measured in a 1% strength solution in dimethylformamide) of 26.6.

Polymer C 237.11 g of a polyester of adipic acid and butane-1,4-diol (molecular weight about 1,000), 24.98 g of hexane-1,6-diol, 1.29 g of trimethylolpropane and 14.69 g of a polyether-1,3-diol sulfonate (molecular weight 1,340) were reacted in 389.34 g of tetrahydrofuran with 43.85 g of toluylene 2,4-diisocyanate at 60° C., after the addition of one drop of dibutyltin dilaurate, until an NCO content of 0% had been reached. 62 g of 4,4'-diphenylmethane diisocyanate were then added and the reaction was continued to the end point (NCO content: 0.28%). 5.42 g of diethanolamine were then added. Thereafter, the resulting polymer solution was diluted to a solids content of 30.0% with 519.11 g of tetrahydrofuran. The polymer had an OH number of 14.9 and a K value (measured in a 1% strength solution in dimethylformamide) of 44.1.

EXAMPLE 1

8,657 g of a slurry, present in a stirred storage container having a capacity of 10 l, were dispersed at a pressure of 0.1 megapascal and at 25° C. with a throughput of 45 kgh$^{-1}$ in the course of 25 hours in a stirred ball mill having a capacity of 0.6 l and containing 1,160 g of steel balls having a diameter of from 1.0 to 1.5 mm.

The slurry consisted of 2,160 g of Co-doped iron oxide having a mean particle size of 0.15 $\mu$m, a length/width ratio of from 4:1 to 7:1, a coercive force of $\geq$55 kAm$^{-1}$ and a specific surface area $\geq$42 m$^2$g$^1$, 240 g of a ferromagnetic chromium dioxide pigment having a mean particle size of 0.24 $\mu$m, a length/width ratio of from 5:1 to 8:1, a coercive force of $\geq$52 kAm$^{-1}$ and a specific surface area of $\geq$30 m$^2$g$^{-1}$, 22 g of carbon black having a specific surface area of >150 m$^2$g$^{-1}$, 163 g of an alumina as a base pigment, 1,586 g of a 20% strength tetrahydrofuran solution of the novel polymer A, 533 g of a 25% strength solution of a vinyl chloride/vinyl acetate/vinyl alcohol copolymer (VAGH ® from Union Carbide) in 1:1 tetrahydrofuran/dioxane, 32 g of stearic acid, 53 g of methyl stearate as a lubricant and 1,215 g of tetrahydrofuran and 2,484 g of dioxane.

The magnetic dispersion was then filtered under pressure through a filter of 1 $\mu$m pore diameter, provided, while stirring, with 169 g of a 50% strength solution of a triisocyanate obtained from 3 mol of toluylene diisocyanate and 1 mol of trimethylolpropane and immediately thereafter applied to a 15 μm thick polyethylene terephthalate film. The coated film was passed through a magnetic field to orient the magnetic particles and then dried at from 60° to 90° C. The magnetic layer was compacted by being passed between heated rollers (65° C., nip pressure 200 kg cm$^{-1}$). The thickness of the magnetic layer was 4 μm. The coated film was then slit into ½ inch wide video tapes.

EXAMPLE 2

The procedure was carried out as in Example 1, except that 1,569 g of a 13% strength solution of the novel polyurethane elastomer (Polymer A) in 1:1 tetrahydrofuran/dioxane was used and the vinyl chloride/vinyl acetate/vinyl alcohol copolymer (VAGH ®) was replaced by 1,327 g of a 20% strength solution of vinyl chloride/vinyl acetate/vinyl alcohol copolymer (MR 110 ® from Nippon-Zeon) in 1:1 tetrahydrofuran/dioxane. 1,962 g of a 1:1 tetrahydrofuran/dioxane mixture were added instead of the 1,215 g of tetrahydrofuran and 2,484 g of dioxane, and 76 g of the 50% strength solution of the triisocyanate instead of 169 g of said solution.

COMPARATIVE EXPERIMENT 1

The procedure was carried out as in Example 1, except that in this case the novel polyurethane elastomer was replaced by 815 g of a 50% strength solution of a low molecular weight polyfunctional polyurethane, having an OH number of 55 and a K value of 30, according to EP 0 099 533, in 1:1 tetrahydrofuran/dioxane, and the 25% strength solution of the vinyl chloride/vinyl acetate/vinyl alcohol copolymer (VAGH) was replaced by 229 g of a 20% strength solution of this copolymer in 1:1 tetrahydrofuran/dioxane. 39 g of a phosphoric ester of a fatty alcohol alkoxylate (Lutensit AEP ® from BASF) were used as the dispersant. 3,780 g of a 1:1 tetrahydrofuran/dioxane mixture were added instead of the 1,215 g of tetrahydrofuran and 2,484 g of dioxane, and 276 g of the 50% strength triisocyanate solution were added instead of 169 g of said solution.

COMPARATIVE EXPERIMENT 2

The procedure was carried out as in Comparative Experiment 1, except that in this case 144 g of the oligomeric phosphoric ester Lutensit AEP ® were used instead of 39 g of said ester.

EXAMPLE 3

The slurry was composed of 2,160 g of a ferromagnetic chromium dioxide pigment having a mean particle size of 0.24 μm, a length/width ratio of from 5:1 to 8:1, a coercive force of $\geq$ 52 kAm$^{-1}$ and a specific surface area of $\geq$ 30 m$^2$g$^{-1}$, 240 g of a Co-doped iron oxide having a mean particle size of 0.15 μm, a length/width ratio of from 4:1 to 7:1, a coercive force of $\geq$ 55 kAm$^{-1}$ and a specific surface area of $\geq$ 42 m$^2$g$^{-1}$, 988 g of a 50% strength solution of the novel polyurethane A in tetrahydrofuran, 514 g of a 10% strength solution of a polyvinylformal (Pioloform FN 65 ® from Wacker) in tetrahydrofuran, 12 g of stearic acid, 31 g of methyl stearate as a lubricant and 1,452 g of tetrahydrofuran and 1,946 g of dioxane.

The magnetic dispersion was processed as described in Example 1; 307 g of the 50% strength solution in triisocyanate were used instead of 169 g of said solution.

COMPARATIVE EXPERIMENT 3

The procedure was carried out as described in Example 3, except that the 988 g of the novel polyurethane were replaced by 39 g of a phosphoric ester of a fatty alcohol alkoxylate (Lutensit AEP ® from BASF) and by 896 g of a 50% strength solution of a low molecular weight polyfunctional polyurethane, having an OH number of 55 and a K value of 30, according to EP 0 099 533, in 1:1 tetrahydrofuran/dioxane. As the solvent, 3,446 g of a 1:1 tetrahydrofuran/dioxane mixture were added instead of the 1,452 g of tetrahydrofuran and the 1,946 g of dioxane.

Use of the novel polyurethane led to a stable dispersion without the use of additional low molecular weight dispersants (surfactants). Dispensing with the dispersant groups in the novel polyurethane resulted, especially in the case of the Co-doped iron oxides, in a very high surfactant requirement. Consequently, the durability in a humid climate was unsatisfactory (Table 1).

(1) Gloss measurement: The reflectance was measured at an angle of 60° to the non-surface-treated layer.
(2) Durability in a humid climate: The cassettes were subjected, in a VHS recorder, to continuous operation at 100 cycles for 2 hours at 40° C. and 85% relative humidity.

TABLE 1

|  | Gloss | Durability |
| --- | --- | --- |
| Example 1 | 103 | satisfactory |
| Example 2 | 99 | satisfactory |
| Comparative Experiment 1 | 41 (unstable) | — |
| Comparative Experiment 2 | 118 | blocks |
| Example 3 | 112 | satisfactory |
| Comparative Experiment 3 | 114 | satisfactory |

The following measurements were carried out on the magnetic recording media provided for the video sector, on a VHS recorder from Victor Company of Japan, against the reference tape BRV 84 (0 dB), and on an S-VHS recorder HRS 7000 from Victor Company of Japan, against the reference tape TRS-1 (0 dB):

(3) Video signal (luminance signal): A 100% luminance signal measured using a UPSF noise voltage meter from Rohde und Schwarz (>100 kHz).
(4) Video S/N: Ratio of the 100% luminance signal to the noise level, measured using a UPSF noise voltage meter from Rohde und Schwarz (>100 kHz).
(5) Chroma S/N: Ratio of the chroma signal of a red area to the noise level, measured using a UPSF noise voltage meter from Rohde und Schwarz (100 kHz-3 MHz).

The results of the measurements are shown in Table 2.

TABLE 2

|  | VHS | | | S-VHS | | |
| --- | --- | --- | --- | --- | --- | --- |
|  | Luminance signal | S/N | Chroma S/N | Luminance signal | S/N | Chroma S/N |
| Example 1 | 3.7 | 5.1 | −0.4 | 2.0 | 2.5 | −1.4 |
| Example 2 | 3.9 | 4.5 | −1.0 | 2.9 | 3.0 | −1.2 |
| Comp. Expt. 1 | not dispersible, hence no measured values | | | | | |
| Comp. | 2.9 | 5.5 | −0.4 | 1.5 | 1.8 | −1.8 |

TABLE 2-continued

|  | VHS | | | S-VHS | | |
|---|---|---|---|---|---|---|
|  | Luminance signal | S/N | Chroma S/N | Luminance signal | S/N | Chroma S/N |
| Expt. 3 | | | | | | |
| Example 3 | 3.4 | 6.0 | −1.7 | 2.6 | 2.8 | −0.2 |
| Comp. Expt. 3 | 2.9 | 5.3 | −1.1 | 2.2 | 2.3 | −1.0 |

EXAMPLE 4

The slurry was composed of 2,160 g of a Co-doped gamma-iron oxide having a mean particle size of 0.2 μm, a length/width ratio of from 4:1 to 7:1, a coercive force of 55 kAm$^{-1}$ and a specific surface area of 42 m$^2$g$^{-1}$, 240 g of a ferromagnetic chromium dioxide having a mean particle size of 0.24 μm, a length/width ratio of from 5:1 to 8:1, a coercive force of 52 kAm$^{-1}$ and a specific surface area of 30 m$^2$g$^{-1}$, 24 g of carbon black having a specific surface area of 150 m$^2$g$^{-1}$, 180 g of an alumina, 924 g of a 50% strength solution of polymer B in tetrahydrofuran, 238 g of a 20% strength solution of a polyvinylformal (Pioloform FN 50® from Wacker) in tetrahydrofuran, 12 g of stearic acid, 12 g of methyl stearate, 1,920 g of tetrahydrofuran and 1,920 g of dioxane.

After dispersion in a stirred ball mill, as described in Example 1, 291 g of a 50% strength tetrahydrofuran solution of a polyisocyanate obtained from 3 mol of toluylene diisocyanate and 1 mol of trimethylolpropane were added to the filtered dispersion while stirring. Further processing of the dispersion was carried out as described in Example 1.

EXAMPLE 5

The procedure was carried out as described in Example 4, except that 22 g of carbon black and 163 g of an alumina were used. The binder used comprised 1,704 g of a 20% strength solution of polymer C in tetrahydrofuran and 532 g of a 25% strength solution of the vinyl chloride/vinyl acetate/vinyl alcohol copolymer VAGH® in tetrahydrofuran. 32 g of stearic acid and 53 g of methyl stearate were added as lubricants and 620 g of tetrahydrofuran and 1,983 g of dioxane were used as solvents. Dispersing was carried out in a stirred ball mill as described in Example 1. The dispersion had to be diluted with 640 g of 1:1 tetrahydrofuran/dioxane after 6 hours and with 340 g of 1:1 tetrahydrofuran/dioxane after a dispersing time of a further 12 hours. Before coating, 108 g of a 50% strength tetrahydrofuran solution of the polyisocyanate used in Examples 1 to 4 were added. Results of Examples 4 and 5

Polymer B led to dispersions having very good rheological properties and could be applied as a coating without problems. The dispersions gave very good magnetic, electroacoustic and video values.

Polymer C led to dispersions which, in spite of a substantially reduced solids content, had disadvantageous rheological properties and could be processed only with difficulty. Further dilution led to very irregular tape surfaces (coating structure), which markedly reduced the quality of the magnetic recording.

As a result of the disadvantageous rheology, the orientability of the magnetic pigment was greatly reduced.

|  | Orientation ratio | Residual induction | Squareness | Switching field distribution |
|---|---|---|---|---|
| Example 4 | 2.9 | 140 mT | 0.88 | 0.30 |
| Example 5 | 1.9 | 130 mT | 0.79 | 0.33 |

|  | VHS | | | S-VHS | | |
|---|---|---|---|---|---|---|
|  | Luminance signal | S/N | Chroma S/N | Luminance signal | S/N | Chroma S/N |
| Example 4 | 3.9 | 5.5 | −0.4 | 2.5 | 2.4 | −1.8 |
| Example 5 | 2.6 | 4.2 | −0.8 | 0.8 | 0.5 | −1.8 |

We claim:

1. A magnetic recording medium, consisting of a nonmagnetic substrate and at least one magnetic layer bonded thereon and based on a magnetic material distributed in a binder consisting of not less than 50% by weight of a thermoplastic polyurethane, wherein the thermoplastic polyurethane used is an isocyanate-free, branched polyurethane which is soluble in tetrahydrofuran and has sulfonate groups along the polyurethane branches and OH-containing urea groups at the chain ends and a molecular weight of from 4,000 to 30,000, and which is prepared from A) 1 mol of a polydiol having a molecular weight of from 400 to 4,000, B) from 0.3 to 9 mol of a mixture of
    B1) one or more diols of 2 to 18 carbon atoms and
    B2) a diol having one or more sulfonate groups, C) 0.01 to 1 mol of a triol or polyol of 3 to 25 carbon atoms, D) from 1.25 to 13 mol of a diisocyanate of 6 to 30 carbon atoms, the NCO:OH ratio in the sum of the components A, B, C and D being from 1.05:1.0 to 1.4:1.0, and E) from 0.05 to 4 mol of an OH-containing primary or secondary amine which is reactive toward isocyanates.

2. A magnetic recording medium as claimed in claim 1, wherein component B2) is a compound of the formula (I)

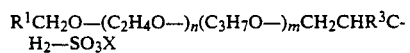

where R$^1$ is

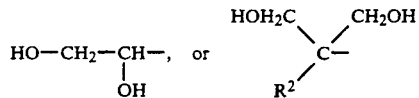

R$^2$ is CH$_3$—, C$_2$H$_5$— or C$_3$H$_7$—,
R$^2$ is H— or CH$_3$—,
X is H or an alkali metal or ammonium ion,
n is from 0 to 100,
m is from 0 to 50 and
n+m≧1.

3. A magnetic recording medium as claimed in claim 1, wherein component B2) is a compound of the formula (I)

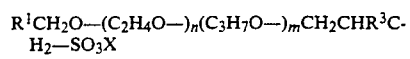

where R$^1$ is

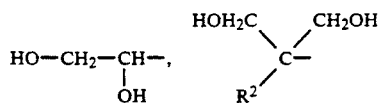

$R^2$ is $CH_3$—, $C_2H_5$— or $C_3H_7$—,
$R^3$ is H— or $CH_3$—,
X is H or an alkali metal or ammonium ion,
n is from 0 to 100,
m is from 0 to 50 and
$n+m \geq 1$,
and 4,4'-diphenylmethane diisocyanate is used as component D).

4. A magnetic recording medium as claimed in claim 1 wherein component B2) is a diol of the formula (II)

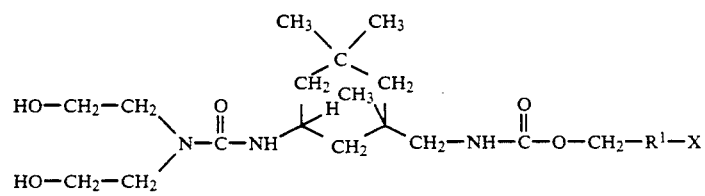

where
$R^1$ is a straight-chain or branched or cyclic radial of 1 to 40 carbon atoms, the carbon atoms accounting for from 30 to 86% by weight, or

$R^3$ is H or $CH_3$,
n is from 0 to 100,
m is from 0 to 50,
$n+m \geq 1$ and
X is —$SO_3M$, where M is H, Li, Na, K or ammonium.

5. A magnetic recording medium as claimed in claim 2, wherein component B2) is a diol of the formula (II)

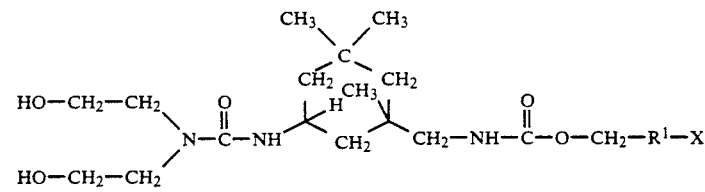

where
$R^1$ is a straight-chain or branched or cyclic radical of 1 to 40 carbon atoms, the carbon atoms accounting for from 20 to 86% by weight, or

$R^3$ is H or $CH_3$,
n is from 0 to 100,
m is from 0 to 50,
$n+m \geq 1$ and
X is —$SO_3M$,
where M is H, Li, Na, K or ammonium.

6. A magnetic recording medium as claimed in claim 3, wherein component B2) is a diol of the formula (II)

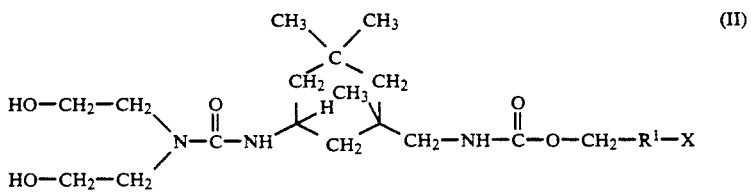

where
$R^1$ is a straight-chain or branched or cyclic radical of 1 to 40 carbon atoms, the carbon atoms accounting for from 20 to 86% by weight, or

—CH₂—O(̵CH₂—CH₂—O)̵ₙ(̵CH₂—CH(CH₃)—O)̵ₘCH₂—CH(R³)—CH₂—

$R^3$ is H or $CH_3$,
n is from 0 to 100,
m is from 0 to 50,
$n+m \geq 1$ and
X is —$SO_3M$,
where M is H, Li, Na, K or ammonium.

7. A magnetic recording medium as claimed in claim 1, wherein some or all of component B1 is replaced by diamines of 2 to 15 carbon atoms.

8. A magnetic recording medium as claimed in claim 1, wherein some or all of component B1 is replaced by a primary or secondary aminoalcohol of 2 to 20 carbon atoms.

9. A magnetic recording medium as claimed in claim 1, wherein some or all of component B1 is replaced by water.

10. A magnetic recording medium as claimed in claim 1, wherein the thermoplastic, isocyanate-free, branched polyurethane which is soluble in tetrahydrofuran and has sulfonate groups along the polyurethane branches and OH-containing urea groups at the chain ends is crosslinked with an isocyanate from the group consisting of the di-, tri- and polyisocyanates and of the isocyanate prepolymers having a molecular weight of up to 10,000.

11. A magnetic recording medium as claimed in claim 1, wherein more than 80% of the terminal OH groups consist of an

—NH—CO—NR'—R—OH or

-continued

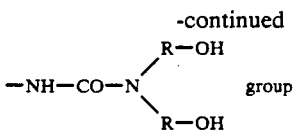 group where R is $-(CH_2)_n-$, R' is $-H$, $-CH_3$ or $-(CH_2)_n-CH_3$ and n is from 1 to 10.

12. A magnetic recording medium as claimed in claim 10, which contains the stated polyurethane as the sole binder.

13. A magnetic recording medium as claimed in claim 1, wherein the OH number of the novel polyurethanes is from 25 to 70.

14. A magnetic recording medium as claimed in claim 1, wherein the K value of the novel polyurethanes is from 25 to 37.

* * * * *

UNITED STATES PATENT AND TRADEMARK OFFICE
CERTIFICATE OF CORRECTION

PATENT NO. : 5,266,407
DATED : Nov. 30, 1993
INVENTOR(S) : KEPPELER et al.

It is certified that error appears in the above-identified patent and that said Letters Patent is hereby corrected as shown below:

Claim 4, column 17, line 40, "30" should be --20--.

Signed and Sealed this

Seventeenth Day of May, 1994

Attest:

BRUCE LEHMAN

Attesting Officer
Commissioner of Patents and Trademarks